June 4, 1974  H. G. NADEAU  3,814,659
NOVEL COMPOSITIONS
Filed Jan. 3, 1972

HERBERT G. NADEAU
INVENTOR

By Denis A Little

Agent 3,814,659
NOVEL COMPOSITIONS
Herbert G. Nadeau, New Haven, Conn., assignor to The
 Upjohn Company, Kalamazoo, Mich.
Filed Jan. 3, 1972, Ser. No. 215,162
Continuation-in-part of abandoned application Ser. No.
 111,572, Feb. 1, 1971. This application Jan. 3, 1972,
 Ser. No. 215,162
Int. Cl. B32b 3/26
U.S. Cl. 161—161
15 Claims

ABSTRACT OF THE DISCLOSURE

Thermal barrier laminates are disclosed having a polyisocyanurate foam core, outer facing sheets and one or more inner layers of heat resistant material extending through the core serving to separate the core into two or more distinct layers. This structure leads to greatly enhanced resistance to heat penetration and total degradation of the thermal barrier upon exposure to fire. Incorporation of the thermal barrier laminate into a build-up roof not only provides thermal insulation but forms a fire retardant barrier adequate to meet existing construction codes for such structures. The thermal barrier laminates can also be employed in a variety of ways in which existing barriers are employed, e.g. building panels, fire doors, pipe insulation and the like.

CROSS-REFERENCE TO RELATED APPLICATION

This application is a continuation-in-part of co-pending application Ser. No. 111,572, filed Feb. 1, 1971, now abandoned.

BACKGROUND OF THE INVENTION

Field of the invention

This invention relates to laminates and is more particularly concerned with foam cored laminates useful as thermal barriers and with methods for their preparation.

Description of the invention

The use as thermal barriers of laminates composed of outer skins and a fire retardant-core is well recognized in the art. The outer skins are generally fabricated from asbestos sheet, metal foil, reinforced fiber glass, and the like, and the fire retardant core has been fabricated from a wide variety of inorganic non-combustible materials such as asbestos, gypsum, perlite, fiber glass and the like. The latter materials, when used in sufficient thickness to provide the necessary protection against heat and flame penetration, have disadvantages such as excessive weight, tendency to absorb moisture and the like. This militates against the use of such barriers in applications such as incorporation in built-up roofs and other forms of construction.

Attempts have been made to overcome this problem by employing the relatively lightweight and non-moisture absorbent polymer foams as core material. The use of polyurethane foams in particular for this purpose, because of their good insulation properties, has been widely investigated. However, even by loading such foams with fire retardant additives, it is not possible to achieve any great degree of resistance to degradation on exposure to open flame and other conditions generally created by an actual fire. Further, the smoke which is generated by polyurethane foams, including toxic fumes created when halogen-containing fire retardant additives are present in said foams, has led to an increasing need to avoid the use of such materials in the construction of thermal barriers.

More recently, a new generation of polymer foam material has appeared in which the isocyanurate moiety is the major recurring chemical unit. These materials have much greater stability and resistance to heat than do polyurethanes and this resistance is achieved without the use of any significant amounts of fire retardant additives.

The smoke generated by combustion of these materials is much smaller in volume than that generated by combustion of an equivalent amount of a polyurethane foam and is relatively free of toxic components generated by combustion of conventional halogen-containing fire retardant additives.

The incorporation of such polyisocyanurates as core material in thermal barrier laminates leads to products which give strikingly better results in heat and flame penetration tests than corresponding products in which the core is a fire retardant polyurethane. However, it is found that, when polyisocyanurate foams are employed in core thicknesses of about 2 inches or higher, which thicknesses are generally necessary to meet the desired performance characteristics in laminated thermal barriers, a troublesome phenomenon is encountered. Thus, it is found that sudden exposure of these laminates to conditions of high temperature, simulating those to be encountered in an actual fire, can cause severe shrinkage in the portion of polyisocyanurate foam core closest to the heat source. This, in turn, can lead to local structural failure in the foam core and, under certain circumstances, can lead to fissures in the core through which heat and/or flame can pass without hindrance.

Accordingly, it has been found that laminated thermal barriers in which the core is composed of polyisocyanurate foam frequently fail to pass the heat penetration and like tests which are used to determine the ability of such products to meet building codes and like requirements. We have now found that, by modifying the structure of the laminates in a manner to be described in detail hereafter, it is possible to eliminate the above deficiency in the performance of isocyanurate-foam covered laminates. Further, not only does the structure of the present invention overcome the tendency to structural failure in the core but it also markedly, and surprisingly, increases the resistance to heat penetration and burn-through times of said laminates.

SUMMARY OF THE INVENTION

In its broadest aspect our invention consists of a multi-layered heat barrier comprising in combination:

(i) a plurality of layers of substantially rigid polymer foam core characterized in that the major recurring chemical linkage therein is the isocyanurate moiety;
(ii) said layers being separated one from another by a relatively thin layer of heat resistant material; and
(iii) facing sheets bonded to the outer surfaces of said layers of foam core.

The laminated heat barriers of the invention are useful as components in the preparation of built-up roofs and are additionally useful in the preparation of heat and flame resistant wall panels and the like structural materials, fire doors, bulkheads, pipe insulation and the like.

The invention also comprises improved built-up roof structures in which the above laminates form the heat barrier and insulating layer.

DETAILED DESCRIPTION OF THE INVENTION

Figure 1:
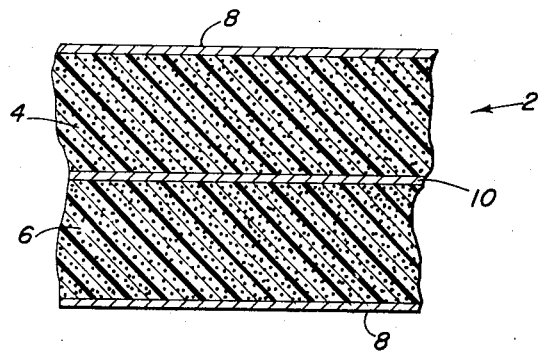
FIG. 1 shows a partial cross-sectional view of a laminated thermal barrier in accordance with the invention.

The facing sheets employed in preparing the thermal barrier laminates of the invention can be fabricated of the same or different materials, which latter can be any of the materials currently used in the preparation of foam cored laminates of this class. Such materials can be flexible or rigid and include ferrous and non-ferrous metal plastics such as polyethylene, polypropylene and the like, plastic laminates, asbestos sheet, fiber-reinforced polyester resins, perlite, Masonite, building papers, roofing felt, asbestos felt and the like. These sheet materials can be employed in a wide range of thicknesses from about 0.001 inches to about 0.25 inches or even higher in the case of materials such as perlite, Masonite and the like. Preferably, the sheet materials are sufficiently flexible to be dispensed from rolls and are adapted to be employed in conventional continuous laminating machines. The preferred facing materials are (i) metallic foils such as aluminium foil and (ii) asbestos felt building paper each having a thickness of from about 0.001 inches to about 0.010 inches.

A relatively thin layer of heat resistant material separates the various foam core layers one from another. By relatively thin is meant that the thickness of the layer is small compared to that of the average thickness of the foam core layers. Advantageously, the thickness of the layer of heat resistant material is of the same order as that of the facing sheets discussed above, i.e. from about 0.001 inches to about 0.25 inches. By heat resistant is meant that the material either (a) will not immediately combust, melt, or otherwise deteriorate when exposed to temperatures of the order of 1000° F. under actual test conditions or (b) is converted, by exposure to temperatures of up to about 1000° F. to a material which will then withstand further exposure to such temperatures for prolonged periods. Examples of materials falling within category (a) are metallic foil including both ferrous and non-ferrous metals, asbestos sheet, perlite, Masonite and the like. Examples of materials falling within category (b) are kraft paper and corrugated cardboard (both of which are reduced to a char upon initial exposure to heat but which, in the charred state between the foam core layers, exhibit the desired heat resistance); composites of an adhesive such as polyurethane, polyimide, polypyrone, polybenzimidazole and a filler such as sand, fusible silica, perlite powder and the like, which fuses to a heat resistant layer on exposure to temperatures of the order of those set forth above; and polymer foams such as polyimide, polyisocyanurate and the like which are subject to charring but which in the charred state withstand further exposure to heat.

The preferred heat resistant materials for use in separating the various foam core laminates of the invention are metallic foils. The most preferred material is aluminum foil having a thickness of from about 0.001 inches to about 0.010 inches.

The foam core of the laminates of the invention is a member of the class commonly known as polyisocyanurate foams. These foams are prepared generally by reacting an organic polyisocyanate with a trimerization catalyst or combination of catalysts under foam producing conditions. The major recurring unit in the resulting polymer chain is the isocyanurate moity, i.e. the moiety having the structure:

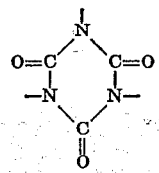

wherein each of the free valencies attached to N is linked to the organic residue of the polyisocyanate starting material. By "major recurring unit" is meant that at least 50 percent of the total number of the recurring units in the polymer chain are of the above structure. On the basis of the major contribution made by the above unit to the chemical srructure of the polymer, the latter is appropriately termed a polyisocyanurate.

However, it is to be understood that the chemical structure and compositions of the polymer foams of the invention need not be exclusively composed of isocyanurate moieties. A minor proportion, i.e. less than 50 percent, and generally less than 10 percent of the total number of units in the polymer chemical structure, can be moieties other than isocyanurate, depending upon the particular polymer foam system employed in the preparation of the novel foams of the invention. For example, when an epoxide is employed as part of the catalyst combination in the foam reaction mix, there will be present in the end product a minor proportion of oxazolidinone moieties, i.e. moieties having the structure:

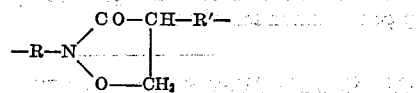

wherein R represents the residue of the organic polyisocyanate starting material and R' represents the residue of the epoxide starting material.

Similarly, a minor proportion, i.e. from about 0.05 equivalents to about 0.2 equivalents per equivalent of polyisocyanate, of dicarboxylic acid anhydride can be added to the foam reaction mixture and this material, by reaction with the organic polyisocyanate, will give rise to a minor proportion of imide moieties in the chemical structure of the final polymer, i.e. moieties having the structure:

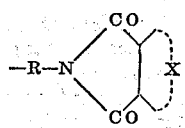

wherein R represents the residue of the organic polyisocyanate starting material and X represents the residue of the dicarboxylic anhydride starting material.

In a further embodiment of the foams employed in making the laminates of the invention, a minor proportion, i.e. from about 0.05 equivalents to about 0.2 equivalents per equivalent of isocyanate, of a polycarboxylic acid can be added to the foam reaction mixture and this material, by reaction with the organic polyisocyanate, will give rise to a minor proportion of amide moieties in the chemical structure of the final polymer. Illustratively, by employing a dicarboxylic acid in this manner, minor proportions of moieties of the structure:

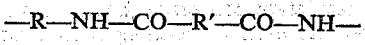

wherein R is the residue of the organic polyisocyanate and R' is the residue of the dicarboxylic acid, will be present in the chemical structure of the final polymer.

In certain instances there can be added to the polymer foam reaction mixture, a minor amount, i.e. from about 0.05 equivalents to about 0.2 equivalents per equivalent of isocyanate, of a polyol. The latter reacts with the organic polyisocyanate in the preparation of the polymer foam and gives rise to a minor proportion of urethane linkages, i.e.

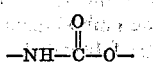

linkages, in the chemcial structure of the final polymer.

The preparation of polyisocyanurate foams (i.e. foams in which the isocyanurate moiety is the major recurring unit in the polymer chain) is described in, for example, British Specification 1,104,394, 1,146,661, 1,212,663, in German Specification 1,904,575, in Netherlands Specification 68/04131, and in Journal of Cellular Plastics, January 1965 at pages 85–90.

In general the preparation of such polyisocyanurate foams involves reacting an organic polyisocyanate with a trimerization catalyst under foam producing conditions. The trimerization catalysts employed include tertiary organic amines optionally, but preferably, in combination with an epoxide, preferably a monomeric homocyclic polyepoxide.

By "foam producing conditions" is meant conditions well recognized in the art as being necessary for the preparation of polymer foams from chemically reactive components. Thus, the polyisocyanate and trimerization catalyst are brought together at a temperature within the range of about 15° C. to about 50° C. in the presence of a blowing agent. Surfactants, cell stabilizers, and like adjuvants, commonly employed in the art to improve or control the quality of the resultant foam, can be employed if desired. In addition to the polyisocyanate, catalyst, blowing agent, and the conventional adjuvants, there can be present in the reaction mixture a minor amount, advantageously less than about 50 percent by weight of polyisocyanate and preferably less than 20 percent by weight of polyisocyanate, of a polyol such as those illustrated in the aforesaid British specification, and/or a polycarboxylic acid or polycarboxylic polyanhydride as exemplified in German Offenlegungsschrift 2,003,550.1. The presence of a polyol in the reaction mixture will give rise to a minor proportion of urethane linkages in the resulting polymer as was discussed previously. The presence of a polycarboxylic acid anhydride in the reaction mixture will give rise to a minor proportion of imide moieties in the resulting polymer as was discussed previously. Similarly, the presence of a polycarboxylic acid in the reaction mixture will give rise to the presence of amide moieties in the resulting polymer. The amounts of polycarboxylic acid and/or polycarboxylic anhydride employed in the reaction are so chosen that the percentage of amide and/or imide moieties in the resulting polymer is within the limits set forth hereinabove.

The average density of the foam core of the laminates of the above invention can vary within wide limits and can be from about 1.5 p.c.f. to about 4 p.c.f. Preferably, said average density is within the range of about 1.8 p.c.f. to about 2.8 p.c.f. The desired density is controlled by adjustment of the amount of blowing agent employed in the foam reaction mixture. Preferred blowing agents are the polyhalogenated aliphatic hydrocarbons conventionally employed as blowing agents in the preparation of rigid polyurethane foams. The latter generally have boiling points ranging from about −40° C. to about 110° C. and include trichloromonofluoromethane, dichlorodifluoromethane, cholrotrifluoromethane, 1,1-dichloro-1-fluoroethane, 1,1-difluoro-1,2,2 - trichloroethane, 1,1,1-tribromo-2-chloro-2-fluorobutane and the like.

The various foam layers of the laminates of the invention can be of approximately equal thickness or they can be of different thickness. When the laminate contains only two foam core layers and these are of different thickness, the layer of lesser thickness is positioned furthest from the expected heat source when the laminate is in use. Whatever the relative thickness of the various layers none of said layers should be of a thickness of less than about 0.25 inch and should not have thickness of substantially greater than about 2 inches. When only two foam layers are present in the laminate, the individual thickness of the two layers is so chosen that the sum of the thickness of said layers combined is within the range of about 0.5 inch to about 4 inches.

The novel laminates of the invention can be prepared by appropriate adaptation of the various methods known in the art for the preparation of foam cored laminates. For example, the individual layers of polymer foam can be fabricated, my molding or by cutting in the desired configuration and dimensions, and then assembled by use of appropriate adhesives, with thin layers of heat resistant materials, as hereinafter defined, separating the layers. The two facing sheets are then bonded to the exterior surfaces of the foam sandwich by use of appropriate adhesives.

Alternatively, the foam laminates of the invention, especially those which are substantially planar and which employ flexible sheet materials for the outer facing sheets and the inner heat resistant layer, can be prepared by adaptation of the various continuous laminating procedures which are known in the art and which generally use flexible facing sheet materials. Thus, the foam laminates of the invention having two foam core layers can be made by applying the appropriate polymer foam reaction mixture to the surface ribbon of a first facing sheet as the latter is advanced on a moving belt, bringing a second continuous ribbon of sheet material appropriate to form the center layer into contact with the rising foam of the lower facing sheet as the latter advances along the moving belt, and then applying a second layer of foam reaction mix to the topside of the second sheet and completing the multilayered laminate by adding a continuous ribbon of facing sheet to the surface of the second layer of rising foam. As will be obvious to one skilled in the art, the above process can be adapted further to produce laminates of the invention having more than two foam core layers.

In yet another alternative mode of construction of the laminates of the invention two separate laminates, each of which is prepared separately in a continuous or batch type operation by pouring or spraying polymer foam reaction mixture on a single layer of facing sheet, are each bonded, by use of appropriate adhesives, to opposite sides of a layer of heat resistant material, as hereinbefore defined, which latter then forms the inner layer of the foam laminate of the invention. This process also can be adapted to produce foam laminates having more than two foam core layers. Variations on these alternatives will be obvious to one skilled in the art. The choice of method will depend on several factors, the chief of which are the relative flexibility of the facing sheets and the desired configuration of the laminate.

The foam laminates of the invention can have any of a wide variety of configurations. Commonly they have a planar configuration and this configuration lends itself most readily to production by continuous laminating methods. The foam laminates of the invention can also take any of a variety of non-planar configurations in order that they can be employed to provide thermal barriers for structures having non-planar surfaces, such as curved roofs, cylindrical or spherical storage tanks, pipes, conduits and the like.

The thermal barrier laminates of the invention will now be illustrated further by reference to the drawings. For the sake of simplicity, the various illustrative examples will show only two foam core layers but it is to be understood that foam laminates having more than two such layers can be prepared by ready adaptation of the procedures discussed below and that the scope of this invention is not limited to laminates having only two foam core layers.

FIG. 1 illustrates a partial cross-section of a planar laminate 2 in accordance with the invention. Polyisocyanurate foam layers 4 and 6 are each bonded on their outer surface to facing sheets 8. The other major surface of each of the foam layers 4 and 6 is bonded to one or other side of the inner layer of heat resistant material 10. The latter layer 10 is shown in sheet form in the embodiment of FIG. 1, and serves to separate the two foam layers 4 and 6. The bonding of the sheets 8 and layer 10 to the foam layers 4 and 6 can be accomplished by use of appropriate adhesives such as polyimide adhesives, polyurethane adhesives, chlorinated rubbers, asphalt based adhesives and the like, in the case when the foam layers 4 and 6 are prefabricated. However, when the polyisocyanurate foam layers 4 and/or 6 are formed by bringing a foam reaction mixture into contact with the facing sheets 8 and/or the inner layer 10 and allowing the foam to expand in contact with the sheets and said layer, the foam mixture is self-bonding and no additional adhesive is necessary.

In the embodiment of FIG. 1 the two foam layers 4 and 6 are shown as having substantially equal thickness. Said thickness can be from about 0.25 inches to about 2 inches provided that the sum of thickness of the layers is within the range of 0.5 inches to 4 inches.

When a source of sudden, violent heat, e.g., an open flame, is applied to the outer surface of the facing sheet 8 in contact with the polyisocyanurate foam layer 6, some shrinkage and possibly cracking or splitting of said layer 6 will be observed. However, minimal damage will be observed in the other polyisocyanurate foam layer 4 and, even in the case of a flame of temperatures as high as 2000° F., no evidence of burn-through of the laminate will be observed until exposure to the flame has been constant over a period of many hours. In contrast, exposure of a corresponding laminate having a single layer of polyisocyanurate foam, having a thickness corresponding to the combined thickness of the two more layers of the laminate shown in FIG. 1, to the same conditions results in cracking or splitting of the foam and resulting failure of the heat barrier.

Figure 2:
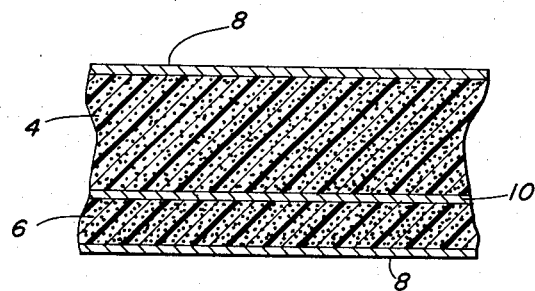
FIG. 2 shows a partial cross-sectional view of another embodiment of a laminated thermal barrier in accordance with the invention.

FIG. 2 illustrates a variation of the embodiment shown in FIG. 1 wherein the polyisocyanurate foam layer 4 has a greater thickness than polyisocyanurate foam layer 6. Advantageously, when such an embodiment is employed as a thermal barrier, said laminate is positioned so that the foam layer 4 of greater thickness is the one which will be exposed initially to the source of heat shock.

Figure 3:
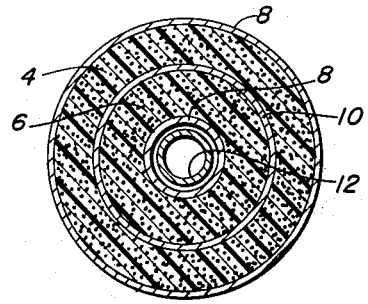
FIG. 3 shows a cross-sectional view of a laminated thermal barrier of the invention installed as insulation on a conduit.

FIG. 3 illustrates a cross-sectional representation of an embodiment of a thermal barrier laminate of the invention which is employed as insulation for a conduit 12. In the particular embodiment shown the outer skins 8 and the inner skin 10 and the polyisocyanurate foam layers 4 and 6 each take the form of concentric cylinders surrounding the conduit 12. The various skins and layers can be fabricated as separate cylinders, if desired, which are then assembled in the appropriate order on the conduit 12. Each component is bonded by use of the appropriate adhesive, as exemplified above, to the adjoining component as the assembly progresses.

Alternatively, the embodiment shown in FIG. 3 can be prepared by assembling the first cylinder of skin 8 on the conduit 12, spraying or spreading the polyisocyanurate foam mix on the exterior of said cylinder of skin 8, sliding the cylinder of inner layer 10 into place over the rising foam so that the latter bonds directly to the inner layer 10 and the latter serves as a mold for the formation of the inner foam layer 6. The process of spraying or spreading a second layer of foam mixture and sliding the outer cylinder of skin 8 into place then completes the formation of the insulated conduit. If desired, the conduit 12 can itself serve as the innermost of the two facing skins of the embodiment shown in FIG. 3.

In a variation of the embodiment shown in FIG. 3, the thermal barrier can be fabricated in semi-cylindrical sections which can then be bonded together, for example by providing lap joints and the like, at the abutting surfaces of the semi-cylindrical sections to form a completed cylinder encircling the conduit 12.

Figure 4:
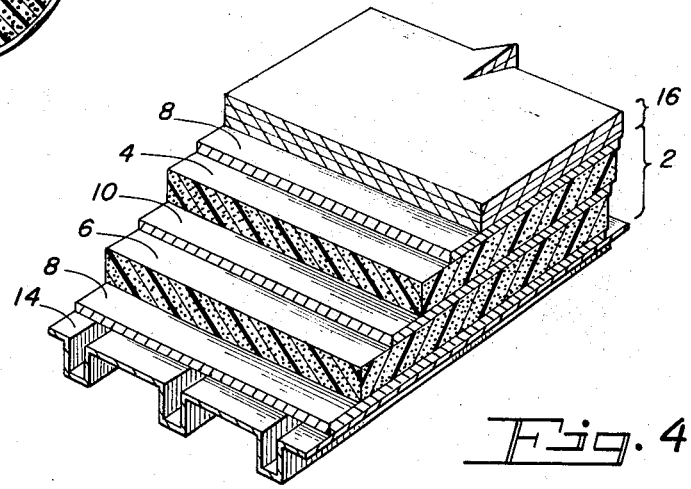
FIG. 4 shows a diagrammatic, pictorial view of a section of a metal roof deck construction with a built-up roof having incorporated therein a thermal barrier laminate of the invention.

FIG. 4 shows a diagrammatic pictorial view of a section of a metal roof deck construction with a thermal barrier of the invention installed as a part of a built-up roof. The roof deck 14 has installed thereon a laminate 2 of the invention. If desired, a vapor barrier is interposed between the laminate and the roof deck but is not shown in the embodiment of FIG. 4. Said laminate 2 of FIG. 4 comprises facing sheets 8 and inner layer 10, shown in sheet form, with the foam core layers 4 and 6 sandwiched therebetween. The laminate 2 can be and preferably is, prefabricated before installation of the roof deck 14 and is bonded thereto by application of an appropriate adhesive such as steep asphalt or cold adhesives including any of those exemplified above, to the roof deck prior to installation. Alternatively, said laminate can be secured to the roof deck by rivets or like fasteners. The laminate 2, when so prefabricated, is installed in sections and it is desirable that the abutting edges of said sections be in close sealing engagement so as to avoid failure of thermal insulation or fire retardancy at the various seams of the resulting structure. Advantageously, the individual sheets are prepared with lap joints and like interlocking means to prevent or minimize risk of failure in the resulting structure.

Alternatively, but less desirably, the laminate 2 can be fabricated in place on the roof deck 14 by any of the methods described above. For example, the laminate 2 can be fabricated by laying facing sheet 8 on said roof deck 14, pouring the first layer 6 of foam in place, installing the inner layer 10 on said foam layer, preferably while the latter is still rising, and then pouring the second foam layer 4 on the top of the inner layer 10, and finally installing the second facing sheet 8 on top of said second foam layer 4. The laminate 2 can also be fabricated in place on the roof deck 14 by laying a single layer of sheet polyisocyanurate foam on top of facing sheet 8, covering the foam layer with the inner layer 10, laying a second layer of sheet polyurethane foam on the upper surface of the inner layer 10 and then covering this second layer with the second facing sheet 8. Preferably each layer is bonded to its neighbors by adhesive. A further alternative comprises applying the first layer of foam as a prefabricated single core laminate having facing sheets already bonded to each side and applying thereto, preferably with adhesive, a second layer of the same single core laminate to form the laminate 2. In this case the inner layer 10 comprises two facing sheets of the single core laminate bonded together by adhesive.

After the laminate 2 has been installed on the roof deck 14 by any of the above methods, the roof is completed by building up layers of asphalt and roofing paper, using conventional roofing procedures to form the weather protective covering 16. The latter can be topped with gravel and the like in accordance with the art of finishing built-up roofs.

The mode of construction of the thermal barrier laminates of the invention and the highly advantageous properties associated with said laminates will now be illustrated by reference to the following non-limiting examples:

EXAMPLE 1

A series of sheets of surface dimensions 2 ft. by 3 ft. and thicknesses varying from ¾ inches to 2 inches, was cut from a polyisocyanurate foam bun (52 inches wide, 26 inches high, 120 inches long) of nominal density 2.0 p.c.f. which had been prepared using a commercial foam bunstock machine equipped with high speed mechanical mixing head and dispenser. The foam was prepared from the following formulation (all parts by weight) using essentially the procedure described in Example 1 of British Patent Specification No. 1,212,663:

| | |
|---|---|
| Polymethylene polyphenyl isocyanate (equivalent weight=133) | 134 |
| Polyepoxide: | |
|    Epoxy novolac resin (eq. wt.=181) | 2 |
|    Glycidyl ether of tetrabromobisphenol A (eq. wt.=378) | 14 |
| Polyester (chlorendic acid based: eq. wt.=161) | 30 |
| Trichlorofluoromethane | 25 |
| Dimethylaminomethylphenol | 8 |
| Organosilicone surfactant | 2 |

The series of sheets was then treated as follows before being subjected to the Bureau of Mines Flame Penetration Test as described by Mitchell et al., Bureau of Mines Report of Investigations 6366, 1964.

(1) Two sheets, one of thickness 1.5 inches and one of thickness 2 inches, were each covered on their two major surfaces with aluminum foil of thickness 0.0015 inches, the foil being bonded to the foam surface in all cases by spreading, onto the side of the foam to be contacted with the foil, polyurethane adhesive in a layer approximately ¹⁄₆₄ inches thick (20 gm./ft.$^2$ application rate).

Two sheets, each of thickness 0.75 inches, were bonded using the above adhesive in approximately ¹⁄₆₄ inch thickness of layer to either side of an aluminum foil sheet of thickness 0.0045 inches, the sheet having the same dimensions as the major surface of each of the foam sheets. There was thus obtained a sandwich having the aluminum foil sheet symmetrically disposed between the two foam sheets. The outer major surface of each foam sheet was then bonded to aluminum foil sheets of 0.0015 inch thickness using the above adhesive in approximately the same thickness as used for the center sheet. The resulting structure was a laminate according to the invention with an inner foil sheet separating two foam layers and outer facing foil sheets covering the exterior of the foam layers. The total thickness of foam in the laminate was 1.5 inches.

(3) A second laminate in accordance with the invention was prepared in exactly the same manner but using two foam sheets each of thickness of 1 inch to produce a resulting laminate having a total thickness of foam of 2 inches.

The results obtained in the Flame Penetration test, which measures the time required under standardized conditions for a flame of temperature 2040°F. to penetrate from one face to the other of the test sheet, were as follows:

| Test sample | Burn-through time (hrs.) |
|---|---|
| (1) 1.5 inches total thickness with foil outer skins | 5.25 |
|      2 inches total thickness with foil outer skins | 10.25 |
| (2) 1.5 inches total thickness with foil center and outer skins. | 15.7 |
| (3) 2 inches total thickness with foil center and outer skins. | 19.2 |

It will be seen from the above results that the center foil laminates of the invention showed a markedly superior behavior to exactly comparable laminates without the center foil sheet. In the case of the 1.5 inch thickness of foam, the center foil laminate of the invention had a burn-through time approximately 3 times as great as the corresponding laminate without the center foil. In the case of the 2 inch thickness of foam, the center foil laminate of the invention had a burn-through time approximately 2 times as great as the corresponding laminate without the center foil. The result is noteworthy in that the melt temperature of the aluminum foil is only 1200° F, far below the temperature of the flame used in the test. Hence the increased resistance to burn-through shown by the laminates of the invention cannot be attributed to heat resistance supplied by the center foil itself.

EXAMPLE 2

Using the polyisocyanurate foam and the laminating procedure described in Example 1, there was prepared a center foil laminate according to the invention using two sheets of polyisocyanurate foam, each of thickness of 1 inch and dimensions of 4.5 x 5 ft., with a center sheet of aluminum foil of thickness 0.0045 inches and the same overall dimensions as the foam sheets and exterior facing sheets of aluminum foil of thickness 0.0015 inches and the same overall dimensions as the foam sheets. Each of the outer aluminum sheets and the inner aluminum sheet were bonded to the respective sheet surfaces using a polyurethane adhesive applied as a coating of approximately ¹⁄₆₄ inch (20 gm./ft. application rate) in thickness. The foam laminate so prepared was then incorporated into a section of a test built-up roof by coating a section (4.5 x 5 ft.) of 18 gauge fluted (5 inch span) steel roof deck with steep asphalt at 400° F. at a rate of 18 lbs. per 100 sq. ft. and placing the foam laminate on said coated deck. The upper surface of the foam laminate was mopped with steep asphalt (400° F.) at a rate of 15 lbs. per 100 sq. ft. and 2 plys of Philips Corey fiber-rock asbestos cap roofing sheet type 15 was applied with a coating of asphalt at 15 lbs. per 100 sq. ft. applied between the layers of sheet. The upper surface of the roofing sheet was flood coated with steep asphalt at 400° F.

The test section of built-up roof so prepared was then submitted to the Factory Mutual Construction Materials Calorimeter test; see, N. J. Thompson et al., National Fire Protection Association Quarterly, January 1959, page 187. The sample was rated acceptable as Class 1 roof construction material, having an average B.t.u./min./sq. ft. release of 231 compared with the maximum figure of 270 permitted in order to pass the test.

The above test demonstrates the utility and acceptability of the center foil laminate of the invention as a component of built-up roofing.

A test sample of built-up roof prepared exactly as described above but omitting the center sheet in the laminate was subjected to exactly the same test under precisely similar conditions. The test sample showed complete failure after only 10 minutes exposure (normal duration of the test is 30 minutes) and was clearly highly inferior to the above test sample. The rate of heat release in this case was in excess of 500 B.t.u./min./sq. ft.

I claim:

1. A multilayered heat barrier comprising, in combination;
   (i) a plurality of layers of substantially rigid polymer foam core characterized in that the major recurring chemical linkage therein is the isocyanurate moiety;
   (ii) said layers being separated one from another by a relatively thin layer of material selected from the class consisting of metallic foil, asbestos sheet, perlite, Masonite, kraft paper and corrugated cardboard; and
   (iii) facing sheets bonded to the outer surfaces of said layers of foam core.

2. A multilayered heat barrier in accordance with claim 1 wherein there are two layers of rigid polymer foam each having a thickness from about 0.25 inches to about 2 inches.

3. A multilayered heat barrier comprising, in combination:
(i) a plurality of layers of substantially rigid polymer foam core characterized in that the major recurring chemical linkage therein is the isocyanurate moiety;
(ii) said layers being separated one from another by a layer of metal foil; and
(iii) facing sheets bonded to the outer surfaces of said layers of foam core.

4. A multilayered heat barrier in accordance with claim 3 wherein the metal foil is aluminum foil having a thickness from about 0.001 inches to about 0.10 inches.

5. A laminated heat barrier comprising:
(i) a substantially rigid polymer foam core characterized in that the major recurring chemical linkage therein is the isocyanurate moiety;
(ii) outer facing sheets bonded to said core and disposed in substantially parallel planes with respect to each other and;
(iii) an inner sheet disposed within said core and extending through substantially all of said core in a plane substantially parallel to those in which the outer facing sheets are disposed, said inner sheet being fabricated from material selected from the class consisting of metallic foil, asbestos sheet, perlite, Masonite, kraft paper, and corrugated cardboard.

6. A laminated heat barrier comprising:
(i) a substantially rigid polymer foam core characterized in that the major recurring chemical linkage therein is the isocyanurate moiety;
(ii) outer facing sheets bonded to said core and disposed in substantially parallel planes with respect to each other and;
(iii) an inner sheet disposed within said core and extending through substantially all of said core in a plane substantially parallel to those in which the outer facing sheets are disposed;
wherein the outer facing sheets and the inner sheet are metal foil of a thickness of from 0.001 inch to about 0.25 inches.

7. A laminated heat barrier according to claim 6 wherein the outer facing sheets and the inner sheet are fabricated from aluminum foil.

8. A laminated heat barrier according to claim 5 wherein the thickness of foam core between each other facing sheet and the inner sheet is from about 0.25 inches to about 2 inches and the total thickness of said foam core is from about 0.5 inches to about 4 inches.

9. A laminated heat barrier according to claim 8 wherein the inner sheet is substantially equidistant from each of the outer facing sheets.

10. A laminated heat barrier according to claim 5 which is of substantially planar configuration.

11. In a built-up roof comprising a roof deck, a heat barrier installed on said roof deck, and a weather resistant covering installed on the upper surface of said heat barrier, the improvement which comprises employing as the heat barrier a laminate of:
(i) a substantially rigid polymer foam core characterized in that the major recurring chemical linkage in said rigid polymer foam is the isocyanurate moiety;
(ii) outer facing sheets bonded to said core and disposed in substantially parallel planes; and
(iii) an inner sheet disposed in said core and extending through substantially all of said core in a plane substantially parallel to those in which the outer facing sheets are disposed, said inner sheet being fabricated from material selected from the class consisting of metallic foil, asbestos sheet, perlite, Masonite, kraft paper, and corrugated cardboard.

12. In a built-up roof comprising a roof deck, a heat barrier installed on said roof deck, and a weather resistant covering installed on the upper surface of said heat barrier, the improvement which comprises employing as the heat barirer a laminate of:
(i) a substantially rigid polymer foam core characterized in that the major recurring chemical linkage in said rigid polymer foam is the isocyanurate moiety;
(ii) outer facing sheets bonded to said core and disposed in substantially parallel planes; and
(iii) an inner sheet disposed in said core and extending through substantially all of said core in a plane substantially parallel to those in which the outer facing sheets are disposed;
wherein the outer facing sheets and the inner sheet are of metal foil of a thickness from about 0.001 inch to about 0.008 inches.

13. A built-up roof according to claim 11 wherein the outer facing sheets and the inner sheet are of aluminum foil.

14. A built-up roof according to claim 11 wherein the thickness of foam core between each outer facing sheet and the inner sheet is from about 1 inch to about 2 inches and the total thickness of said foam core is from about 2 inches to about 4 inches.

15. A built-up roof according to claim 14 wherein the inner sheet is substantially equidistant from each of the outer facing sheets.

References Cited
UNITED STATES PATENTS

| | | | |
|---|---|---|---|
| 3,755,063 | 8/1973 | Massey et al. | 161—161 |
| 3,726,754 | 4/1973 | Coglianese | 161—161 |
| 3,731,449 | 5/1973 | Kephart | 161—161 |
| 3,631,000 | 12/1971 | Argabright et al. | 260—2.5 AW |
| 3,730,923 | 5/1973 | Formaini et al. | 260—2.5 AW |
| 3,458,448 | 7/1969 | Argabright et al. | 260—2.5 AW |
| 2,978,449 | 4/1961 | France et al. | 260—2.5 AW |
| 3,160,549 | 12/1964 | Caldwell et al. | 161—161 |
| 3,265,236 | 8/1966 | Gibbon et al. | 161—160 |
| 3,367,934 | 2/1968 | Tate et al. | 260—2.5 AW |
| 3,370,045 | 2/1968 | Sadie | 260—2.5 AW |
| 3,535,198 | 10/1970 | Bloom | 161—161 |
| 3,567,568 | 3/1971 | Windecker | 161—161 |

GEORGE F. LESMES, Primary Examiner

W. R. DIXON, Jr., Assistant Examiner

U.S. Cl. X.R.

161—159, 160, 190, 205, 219; 156—43, 77; 138—DIG. 9; 260—2.5 AW

UNITED STATES PATENT OFFICE
CERTIFICATE OF CORRECTION

Patent No. 3,814,659     Dated June 4, 1974

Inventor(s) Herbert G. Nadeau

It is certified that error appears in the above-identified patent and that said Letters Patent are hereby corrected as shown below:

Claim 8, Column 11, Line 47:

between each other

Should read:

between each outer

Signed and sealed this 17th day of September 1974.

(SEAL)
Attest:

McCOY M. GIBSON JR.
Attesting Officer

C. MARSHLL DANN
Commissioner of Patents